(12) United States Patent
Schneider et al.

(10) Patent No.: US 6,983,835 B2
(45) Date of Patent: Jan. 10, 2006

(54) ELECTROMAGNETICALLY ACTUATED DUAL CLUTCH-BRAKE COMBINATION

(75) Inventors: Rudolf Schneider, Meck nbeuren (DE); Ünal Gazyakan, Friedrichshafen (DE); Barbara Schmohl, Friedrichshafen (DE); Dieter Beck, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/743,356

(22) Filed: Dec. 22, 2003

(65) Prior Publication Data

US 2004/0144609 A1 Jul. 29, 2004

(30) Foreign Application Priority Data

Jan. 23, 2003 (DE) ................................ 103 02 506

(51) Int. Cl.
*F16D 67/06* (2006.01)
(52) U.S. Cl. .................. 192/18 B; 192/48.2; 192/48.5; 192/48.91
(58) Field of Classification Search ............... 192/14, 192/18 B, 48.2, 48.5, 48.91; 74/665 K
See application file for complete search history.

(56) References Cited

U.S. PATENT DOCUMENTS

| | | | | |
|---|---|---|---|---|
| 4,572,343 A | * | 2/1986 | Boffelli | 192/56.41 |
| 4,592,392 A | * | 6/1986 | Vandeweghe et al. | 139/1 E |
| 4,875,565 A | * | 10/1989 | Depoli | 192/48.2 |
| 5,195,623 A | * | 3/1993 | Sommer | 192/18 B |

FOREIGN PATENT DOCUMENTS

DE 100 58 199 A 11/2002

* cited by examiner

*Primary Examiner*—Richard M. Lorence
(74) *Attorney, Agent, or Firm*—Davis & Bujold, P.L.L.C.

(57) ABSTRACT

In an electromagnetically actuated dual clutch-brake combination (8), a drive input shaft (2) can be optionally engaged in drive connection with a first drive output shaft (4) or with a second drive output shaft (6). The second drive output shaft (6) is associated with an electromagnetic brake (52), which is provided in order to immobilize the second drive output shaft (6), whereas the first drive output shaft (4) can still be connected to the drive input shaft (2) by an electromagnetic clutch (28, 32). The electromagnetic dual clutch-brake combination is suitable for controlling a variable longitudinal differential lock and a shiftable range gear system of an all-wheel distributor gearbox, with only a single electric motor.

9 Claims, 3 Drawing Sheets

ELECTROMAGNETICALLY ACTUATED DUAL CLUTCH-BRAKE COMBINATION

This application claims priority from German Application Serial No. 103 02 506.5 filed Jan. 23, 2003.

FIELD OF THE INVENTION

The invention concerns an electromagnetically actuated dual clutch-brake combination.

BACKGROUND OF THE INVENTION

Such an electromagnetic dual clutch-brake combination is used for the optional drive connection of a drive input shaft to a first or to a second drive output shaft. Depending on the shift condition of the dual clutch-brake combination, a single electric motor coupled to the drive input shaft can drive the first drive output shaft or the second one.

A dual clutch-brake combination of the type described is disclosed in DE 100 58 199 A1.

Such a dual clutch-brake combination can be used in the drive train of an all-wheel vehicle with range shifting between a fast and a slow operating range and a variable longitudinal differential lock. In the vehicle's drive train a shiftable, two-stage range gear system is arranged after the main gearbox, such that the first stage corresponds to the slow drive range and the second stage to the fast range. The range gear system comprises a shift element in the form of a claw or disk clutch or a synchromesh, which can, be actuated by the first drive output shaft of the dual clutch-brake combination via an actuation mechanism. When the second drive output shaft of the dual clutch-brake combination is rotating, then depending on the rotation direction, a disk clutch is closed further or opened further, which depending on its degree of closure transfers a certain torque between the two drive axles of the vehicle. If the disk clutch is fully closed, the front and rear axle differentials are driven at the same speed.

The dual clutch-brake combination according to DE 100 58 199 A1 thus enables a single electric motor optionally to shift the two-stage range gear system or to actuate the variable longitudinal differential lock. The drive input shaft of this dual clutch-brake combination can be braked to rest by an electromagnetic brake. A static torque exerted on the drive input shaft by the electric motor can even be maintained when the electric motor is not under load in that the brake is applied before the electric motor is turned off. The electric motor is unloaded and the overall consumption of electrical energy is reduced. A frequently encountered driving situation on difficult ground is to start with a closed longitudinal differential lock in the slow driving range. When the vehicle has reached a certain speed, a shift to the fast driving range is necessary. If a dual clutch-brake combination such as that described in DE 100 58 199 A1 is used, the driving range can only be shifted if the variable longitudinal differential lock is opened briefly.

Accordingly, the purpose of the invention is to indicate a dual clutch-brake combination with which a shift of the range gear system can take place, while the torque transferred by the variable longitudinal differential lock between the drive axles remains unchanged even during the range shift.

This objective is achieved by an electromagnetically actuated dual clutch-brake combination.

SUMMARY OF THE INVENTION

The second drive output shaft of the dual clutch-brake combination, which is provided for the actuation of the clutch of the longitudinal differential lock, is connected rotationally fast to a brake armature which brakes the second drive output shaft when the brake magnet coil is energized with electric current. When the clutch armature connected rotationally fast to the drive input shaft is in its first shift position, in which it is connected to the first drive output shaft in positive torque transmission, an electric motor connected to the drive input shaft can be used to shift the range gear system from the slow to the fast driving range or vice-versa, so long as the second drive output shaft is firmly braked. Thus even during the shifting of the range gear system optimal traction is ensured by the blocked longitudinal distributor.

In an advantageous embodiment of the invention the clutch armature has at one end a friction surface which in the first shift position of the clutch armature is pressed against an opposite friction surface of a first flange fixed on the first shaft.

In a further embodiment of the invention the clutch armature has a hollow cylindrical area with internal gear teeth which, in the second shift position, engage with the drive gear teeth of a second flange arranged on the second drive output shaft. In this second shift position the clutch armature is held by passive restoring means such as an elastic spring or a permanent magnet. The passive restoring means do not need to exert any large axial force on the clutch armature. Yet, the frictional torque transmission by means of the drive gear teeth enables high torques to be transferred. The axial force exerted on the clutch armature by the magnetic coil of the clutch in the first shift position is large enough for the required torque to be transferred even by the friction surfaces.

An embodiment of the invention, advantageous from the design standpoint is characterized in that the second flange is axially stepped, with the drive gear teeth formed on the radially outer step and with an annular disk spring attached to the radially inner step, which connects the brake armature rotationally fast and axially movably to the second flange.

The second flange can be fixed as a separate component on the second drive output shaft or, in an advantageous design, it can be made as one piece with the second flange.

A favourable arrangement of the functional elements is achieved when the second drive output shaft and the second flange have a through-going hollow space in the area of their rotation axis, through which the first drive output shaft passes.

The dual clutch-brake combination according to the invention is particularly appropriate for the control of an all-wheel distributor gearbox 70 for a vehicle 72 with several driveable axles 74, 76, with a variable longitudinal differential lock 78 and an at least two-stage shiftable range gear system 80 arranged after a main gearbox T of the vehicle 72. The longitudinal differential lock 78 of the all-wheel distributor gearbox 70 comprises a clutch 77 which, depending on the degree of its closure, transfers a torque between the two driveable axles 74, 76, of the vehicle 72. The longitudinal differential lock 78 of the all-wheel distributor gearbox 70 comprises a clutch 77 which, depending on the degree of its closure, transfers a torque between the two driveable axles 74, 76, of the vehicle 72. The range gear system 80 comprises a shift element 82 such that the said shift element 82 of the range gear system 80 can be actuated directly or via an actuation mechanism by the first drive output shaft 4 of the dual clutch-brake combination 8. The degree of closure of the clutch 82 of the longitudinal differential lock 78 can be varied by a rotation of the second drive output shaft 6.

BRIEF DESCRIPTION OF THE DRAWINGS

The invention will now be described, by way of example, with reference to the accompanying drawings in which.

DETAILED DESCRIPTION OF THE INVENTION

Figure 1:
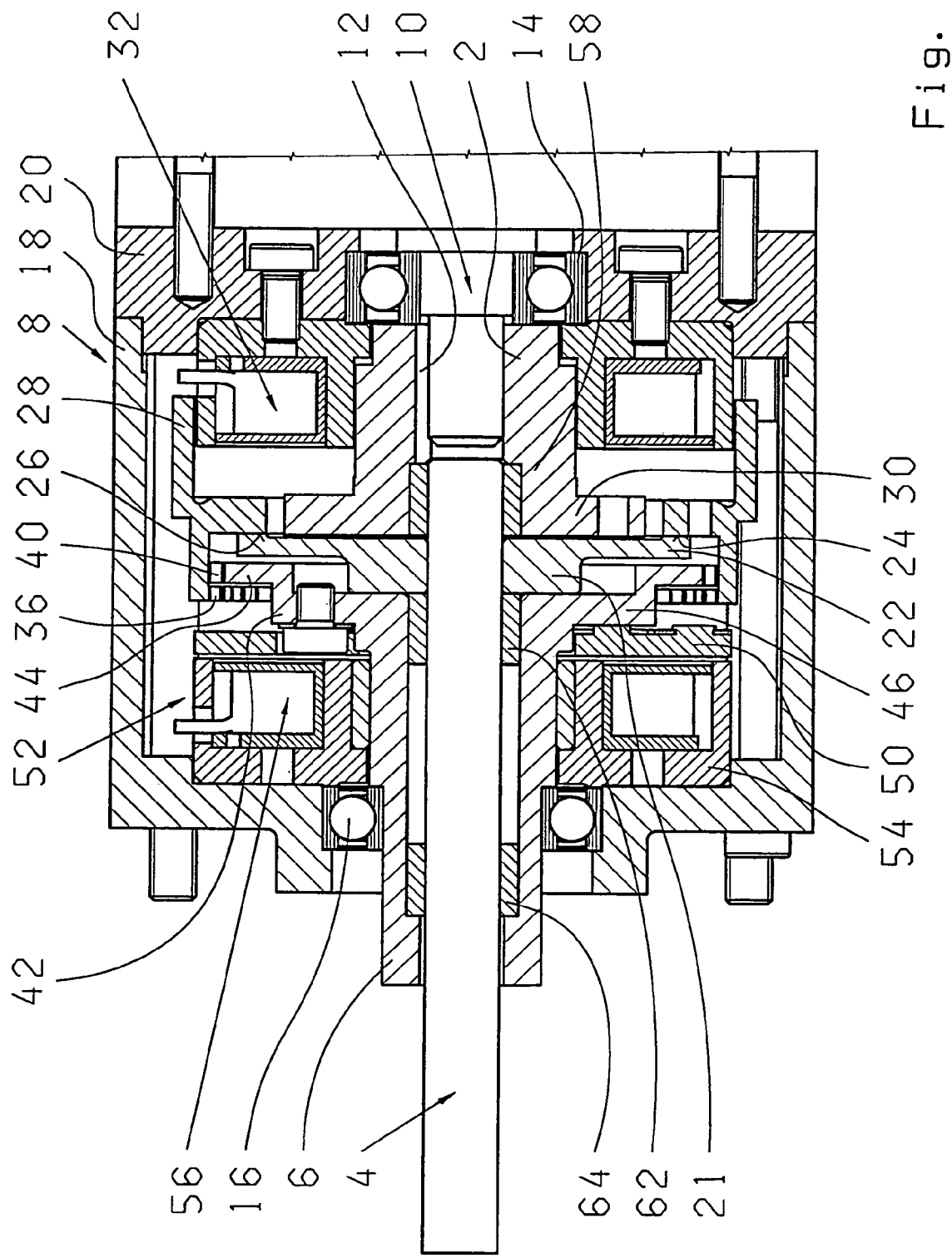
FIG. 1 is a section through a dual clutch-brake combination in a first shift position.
Figure 2:
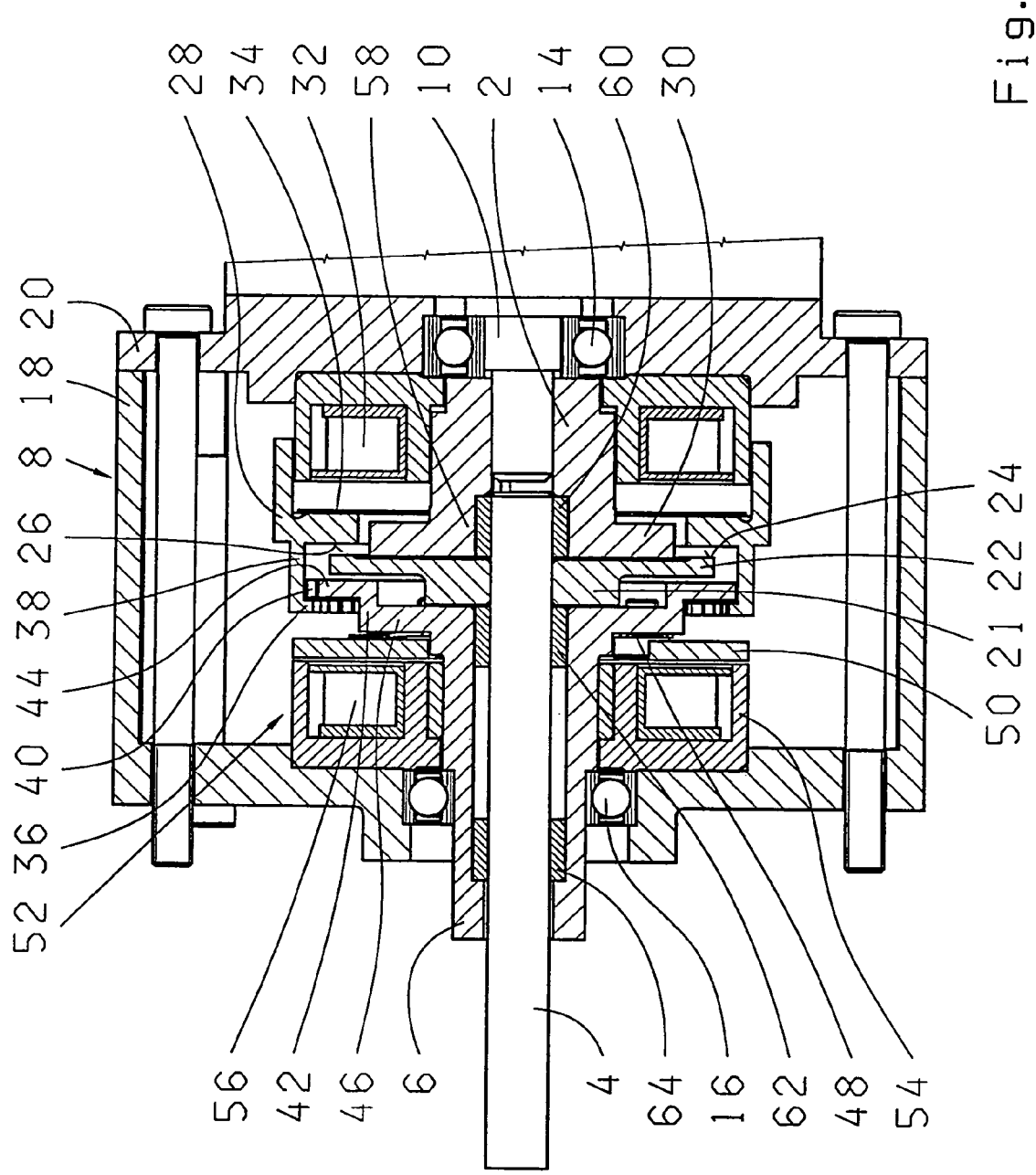
FIG. 2 is a section through a dual clutch-brake combination in a second shift position.
Figure 3:
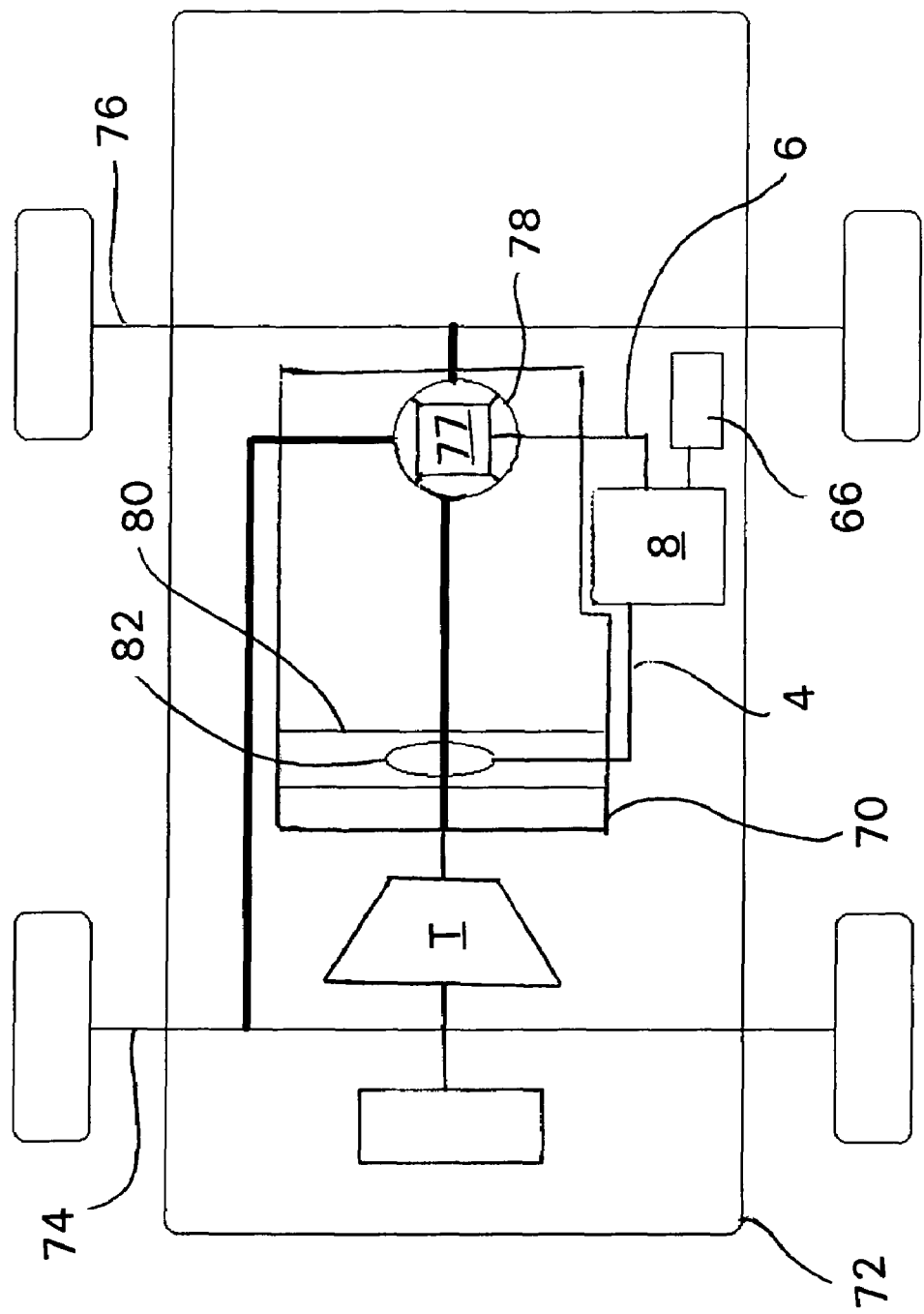
FIG. 3 is a diagrammatic representation of the vehicle drive train.

FIG. 1 shows a drive input shaft 2 of a dual clutch-brake combination 8, a first drive output shaft 4, and a second drive output shaft 6. The input shaft 2 is engaged with the drive output shaft 10 of an electric motor (not shown), which is held in rotationally fixed connection by a keyway joint 12. The drive shaft 2 and the two drive output shafts 4, 6 are axially fixed by bearings 14, 16, but mounted so that they can rotate in a two-part housing 18, 20 of the dual clutch-brake combination 8. On the first drive output shaft 4 is arranged a flange 24, which has at its outer circumference a shoulder 22 whose end face forms a friction surface 24, which is provided in order to cooperate with an opposing friction surface 26 of the clutch armature 28. The clutch armature 28 is connected to a flange 30 of the drive input shaft 2 by an annular disk spring (not shown), rotationally fixed but able to move axially. In the shift position (shown in FIG. 1), a magnetic coil 32 of the clutch is energized with current. Accordingly, the armature moves so that the magnetic circuit establishes contact between the friction surfaces 24, 26 of the flange 21 and the clutch armature 28. Thus, when the magnetic coil of the clutch is switched on, the clutch armature 28 is pressed against the flange 21 so that by virtue of the friction surfaces 24, 26 a torque is exerted by the clutch armature 28 connected to the drive input shaft 2 on the flange 21 connected to the first drive output shaft 4. On its side facing towards the magnetic coil of the clutch, the clutch armature 28 has a hollow cylindrical section which encloses the outer circumference of the magnetic coil 32 of the clutch with a small radial clearance. When the magnetic coil 32 of the clutch is switched off, the armature is moved by an annular disk spring 34 (shown in FIG. 2) toward the right as seen in FIG. 2, into its second shift position, and held there. In this shift position, the friction surfaces 24 and 26 of the flange 20 and the clutch armature 28 are axially separated, so no torque is transferred between the drive input shaft and the first drive output shaft. However, in this second shift position, inner gear teeth 36 present in a hollow cylindrical area 38 of the clutch armature 28 are engaged with drive gear teeth 40 formed on the outer circumference of a flange 42 connected to the second drive output shaft 6. The flange 42 connected to the second drive output shaft 6 is axially stepped, such that the drive gear teeth 40 are formed on a radially outer step 44 and an annular disk spring 48 is attached to a radially inner step 46, which connects a brake armature 50 of an electromagnetic brake 52 rotationally fast, but axially movably to the second drive output shaft 6. The brake armature 50 is attracted by a magnet element 54 of the electromagnetic brake 52 when a brake magnet coil 56 is energized with current. The electromagnetic brake 52 can be actuated independently of the electromagnetic clutch, so that all four shift conditions can be implemented. In particular, it is possible, first, when the clutch magnet coil 32 is switched off, to impose a given torque on the second drive output shaft 6 by means of the input electric motor, which determines the torque transmission in the variable longitudinal differential lock of a distributor gearbox of a vehicle. If the electromagnetic brake 52 is now switched on, this torque is still applied statically to the second drive output shaft 6 even when the clutch magnet coil 32 is energized with current and the connection between the clutch armature 28 and the second output shaft 6 is disengaged. The electric motor can then be used to activate the first drive output shaft 4, by which the range shift between a slow-drive range and a fast-drive range is brought about.

FIG. 1 shows a drive input shaft 2 of a dual clutch-brake combination 8, a first drive output shaft 4, and a second drive output shaft 6. The input shaft 2 is engaged with the drive output shaft 10 of an electric motor 66, which is held in rotationally fixed connection by a keyway joint 12. The drive shaft 2 and the two drive output shafts 4, 6 are axially fixed by bearings 14, 16, but mounted so that they can rotate in a two-part housing 18, 20 of the dual clutch-brake combination 8. On the first drive output shaft 4 is arranged a flange 21, which has at its outer circumference a shoulder 22 whose end face forms a friction surface 24, which is provided in order to cooperate with an opposing friction surface 26 of the clutch armature 28. The clutch armature 28 is connected to a flange 30 of the drive input shaft 2 by an annular disk spring (not shown), rotationally fixed but able to move axially. In the shift position (shown in FIG. 1), a magnetic coil 32 of the clutch is energized with current. Accordingly, the armature moves so that the magnetic circuit establishes contact between the friction surfaces 24, 26 of the flange 21 and the clutch armature 28. Thus, when the magnetic coil of the clutch is switched on, the clutch armature 28 is pressed against the flange 21 so that by virtue of the friction surfaces 24, 26 a torque is exerted by the clutch armature 28 connected to the drive input shaft 2 on the flange 21 connected to the first drive output shaft 4. On its side facing towards the magnetic coil of the clutch, the clutch armature 28 has a hollow cylindrical section which encloses the outer circumference of the magnetic coil 32 of the clutch with a small radial clearance. When the magnetic coil 32 of the clutch is switched off, the armature is moved by an annular disk spring 34 (shown in FIG. 2) toward the right as seen in FIG. 2, into its second shift position, and held there. In this shift position, the friction surfaces 24 and 26 of the flange 20 and the clutch armature 28 are axially separated, so no torque is transferred between the drive input shaft and the first drive output shaft. However, in this second shift position, inner gear teeth 36 present in a hollow cylindrical area 38 of the clutch armature 28 are engaged with drive gear teeth 40 formed on the outer circumference of a flange 42 connected to the second drive output shaft 6. The flange 42 connected to the second drive output shaft 6 is axially stepped, such that the drive gear teeth 40 are formed on a radially outer step 44 and an annular disk spring 48 is attached to a radially inner step 46, which connects a brake armature 50 of an electromagnetic brake 52 rotationally fast, but axially movably to the second drive output shaft 6. The brake armature 50 is attracted by a magnet element 54 of the electromagnetic brake 52 when a brake magnet coil 56 is energized with current. The electromagnetic brake 52 can be actuated independently of the electromagnetic clutch, so that all four shift conditions can be implemented. In particular, it is possible, first, when the clutch magnet coil 32 is switched off, to impose a given torque on the second drive output shaft 6 by means of the input electric motor 66, which determines the torque transmission in the variable longitudinal differential lock 78 of a distributor gearbox 70 of a vehicle 72. If the electromagnetic brake 52 is now switched on, this torque is still applied statically to the second drive output shaft 6 even when the clutch magnet coil 32 is energized with current and the connection between the clutch armature 28 and the second output shaft 6 is disengaged. The electric motor 66 can then be used to activate the first drive output shaft 4, by which the range shift between a slow-drive range and a fast-drive range is brought about.

REFERENCE NUMERALS 2 drive input shaft
4 first drive output shaft
6 second drive output shaft
8 dual clutch-brake combination
10 engine shaft
12 keyway connection
14 bearing
16 bearing
18 housing component
20 housing component
21 flange
22 collar
24 friction surface
26 friction surface
28 clutch armature
30 flange
32 clutch magnet coil
34 annular disk spring
36 inner gear teeth
38 hollow cylindrical area
40 drive gear teeth
42 flange
44 area
46 area
48 annular disk spring
50 brake armature
52 electromagnetic brake
54 magnet element
56 magnet coil
58 area
60 bearing
62 bearing
64 bearing

What is claimed is:

1. An electromagnetically actuated dual clutch-brake combination (8) for the optional drive connection of a drive input shaft (2) to one of a first drive output shaft (4) or a second drive output shaft (6), with a clutch armature (28) connected rotationally fast to the drive input shaft (2), which can be moved axially between a first shift position and a second shift position, and which is connected to transmit torque to the first output shaft (4) in the first shift position and to the second output shaft (6) in the second shift position, with a clutch magnet coil (12) attached on a housing, which brings the clutch armature (28) to the first shift position when energized by electric current, with restoring means (34) which move the clutch armature (28) to the second shift position when the clutch magnet coil (32) is switched off, and with an electromagnetic brake (52) which comprises a brake magnet coil (56) attached to the housing and an axially movable brake armature (50), the brake armature (50) being connected rotationally fast to the second drive output shaft (6), which is braked when the brake magnet coil (56) is energized with electric current.

2. The electromagnetically actuated dual clutch-brake combination according to claim 1, wherein the clutch armature (28) has at one end a friction surface (26) which in the first shift position is pressed against an opposite friction surface (24) of a first flange (20) fixed on the first output shaft (4).

3. The electromagnetically actuated dual clutch-brake combination according to claim 1, wherein the clutch armature (28) has a hollow cylindrical area (38) provided with inner gear teeth (36) which, in the second shift position, engage with the drive gear teeth (40) of a second flange (42) arranged on the second output shaft (6).

4. The electromagnetically actuated dual clutch-brake combination according to claim 3, wherein the second flange (42) is axially stepped, the drive teeth being formed on a radially outer step (44), and an annular disk spring (48) being attached to the radially inner step (46), which connects the brake armature rotationally fast and axially movably to the second flange (42).

5. The electromagnetically actuated dual clutch-brake combination according to claim 3, wherein the second output shaft (6) is constructed as one piece with the second output shaft (42).

6. The electromagnetically actuated dual clutch-brake combination according to claim 3, wherein the second output shaft (6) and the second flange (42) have a through-going hollow space along a rotational axis, through which the first output shaft (4) passes.

7. The electromagnetically actuated dual clutch-brake combination according to claim 3, wherein a widened hub of the first flange (20) adjoins, at a small axial distance away, the radially inner step (46) of the second flange (42), such that, at least in part, the hub occupies the same axial structural space as the radially outer step (44) of the second flange (42).

8. The electromagnetically actuated dual clutch-brake combination according to claim 6, wherein the first output shaft (4) extends axially over the area of the first flange (20) and passes into a hollow cylindrical area (58) of the drive input shaft (2), in which it is mounted.

9. The electromagnetically actuated dual clutch-brake combination according to claim 1, for operation with a vehicle comprising:
   an all-wheel distributor gearbox;
   at least two driveable axles;
   a variable longitudinal differential lock having a clutch which transmits a torque between the at least two driveable axles of the vehicle, depending on a degree of the closure of the clutch;
   an at-least two-stage shiftable range gear system having a shift element and arranged after the main gearbox of the vehicle; and
   wherein the shift element of the range gear system may be actuated by the first drive output shaft (4) of the electromagnetically actuated dual clutch-brake combination while maintaining the degree of closure of the clutch longitudinal differential lock according to the rotation of the second drive output shaft (6).

\* \* \* \* \*